Patented Aug. 25, 1925.

1,550,673

UNITED STATES PATENT OFFICE.

BENJAMIN T. BROOKS, OF SOUND BEACH, CONNECTICUT, ASSIGNOR TO THE MATHIESON ALKALI WORKS, INC., OF NEW YORK, N. Y., A CORPORATION OF VIRGINIA.

TREATMENT OF CRACKED OILS.

No Drawing.  Application filed February 17, 1923.  Serial No. 619,766.

*To all whom it may concern:*

Be it known that I, BENJAMIN T. BROOKS, a citizen of the United States, residing at Sound Beach, in the county of Fairfield, State of Connecticut, have invented certain new and useful Improvements in the Treatment of Cracked Oils; and I do hereby declare the following to be a full, clear, and exact description of the invention, such as will enable others skilled in the art to which it appertains, to make and use the same.

This invention relates to improvements in the treatment of cracked gasoline, pressure distillate, and similar products resulting from the cracking of heavier oils for the production of lighter oils therefrom.

It is well known that cracked gasoline or pressure distillate differs in certain important respects from straight run distillates; in particular the cracked distillates are more difficult to refine by the common refining methods such as treatment with concentrated sulphuric acid; and in order to facilitate their treatment, it is common to mix pressure distillate or cracked gasoline with straight run gasoline before the sulphuric acid refining operation.

The cracked distillates are higher in unsaturated constituents and in particular in unsaturated constituents of a higher degree of unsaturation than the simple olefines. Cracked distillates usually possess a pronounced color which is difficult to remove, or which will reappear on standing after the refining operation. The objectionable color is apparently due in part at least, to unsaturated compounds of a higher degree of unsaturation than simple olefines; but the compounds that give a yellowish or brownish color to the oil are themselves, to a greater or less extent, volatile so that they are not removed by redistillation.

In the treatment of pressure distillate or cracked gasoline with solutions of hypochlorites it is difficult or impossible to get rid of the objectionable yellow color by the hypochlorite treatment since the compounds which give this color do not appear to be acted upon by the hypochlorite but remain and are distilled with the distillate which retains the undesirable yellow color.

According to the present invention the cracked distillates are subjected to a heat treatment process at a sufficient temperature and for a sufficient period of time to remove, apparently by polymerization, the higher unsaturated compounds, and particularly those which give an objectionable color. As a result of this heat treatment the cracked distillates are converted into products more similar to straight run distillates, and which can then be subjected to refining in practically the same way as straight run distillates. The heat treatment of the present invention results in destroying or condensing or polymerizing the volatile coloring matter to such an extent that gasoline may be distilled off from the treated product without the distillation of any objectionable coloring materials until a relatively high temperature is reached.

The materials which can be treated according to the present invention include so-called cracked gasoline or pressure distillate obtained by cracking at high temperatures and pressures in the liquid phase as well as similar cracked products produced by vapor phase cracking, and products obtained by so-called digestion processes carried out at higher temperatures and pressures than are commonly used in pressure distillation.

In treating these materials, for example, cracked gasoline or pressure distillate, the material is heated to a temperature below that at which any considerable cracking takes place but nevertheless sufficiently high to cause condensation or polymerization or reaction of the more highly unsaturated compounds and especially those volatile compounds which give the oil an objectionable color. This temperature range varies somewhat with different cracked distillates but in general it is around 275 to 360° C. or somewhat higher but still below the temperature at which any considerable amount of further cracking takes place. The time element as well as the temperature is important and the temperature of the product undergoing treatment should be maintained for a sufficient period of time to permit condensation or polymerization or reaction of the volatile coloring matter and of other compounds of high degree of unsaturation.

When this heat treatment has been continued at an appropriate temperature for a sufficient period of time, the treated oil can be distilled and a gasoline fraction obtained which is entirely free from objectionable coloring matter up to a relatively high temperature, and above that temperature is but faintly colored. The reaction which appears to take place is one of polymerization of volatile coloring matter to form non-volatile or difficultly volatile coloring matter, although I do not wish to limit myself by any theoretical explanation of the reaction which takes place in the conversion of volatile coloring matter into compounds which are non-volatile or difficultly volatile, or in the conversion of volatile coloring constituents into other constituents.

The invention will be further illustrated by the following specific examples of its application but it is intended and will be understood that the invention is illustrated by, but is not limited to, the specific embodiments thus illustrated and described.

*Example 1.*—A cracked pressure distillate made by cracking in the vapor phase in tubes was used as the starting material. The crude product contained 62% of gasoline up to 225° C. cut, with a Bé. gravity of 41°, and the product was very dark brown in color. The gasoline distillate from this crude product was strongly yellow even in the first distillate or forerunnings. The yellow color was not separated but came over with the distillate on repeated distillation.

This crude pressure distillate was progressively heated over a period of about 4¾ hrs., with progressive rise of temperature and pressure, until the temperature reached 340° C. and the pressure 380 lbs., and it was then held at approximately that temperature and pressure for a period of 3 hrs. and then cooled.

On distillation of the resulting treated product 56% of gasoline was obtained up to 225° C. cut and the distillate was colorless up to about 190° C. while the fraction from 190 to 225 was very faintly yellow.

On treating equal volumes of the gasoline fractions from the crude pressure distillate and the treated product with 5% by volume of 66° Bé. sulphuric acid, with an initial temperature of 21° C. in both cases, and with shaking of the gasoline and acid mixture, the temperature of the gasoline from the crude pressure distillate rose to 67° C., a rise of 46°, while the temperature of the gasoline fraction from the treated product rose only to 36° C., a rise of only 15°. The gasoline from the treated product became only chestnut brown in color and no free sulphur dioxide was evolved while the yellow gasoline from the crude pressure distillate became very black, both in the acid and gasoline layers, and the mixture gave off much sulphur dioxide. On allowing to stand for a period of 12 hrs., the acid tar loss of the crude gasoline was 10½% while that of the heat treated gasoline was only 5%. The acid treatment above referred to is much more strenuous than the usual acid treatment and its action upon the respective products is accordingly much more marked, but it serves to emphasize the profound change which has taken place in the product during the heat treatment operation.

The product from the heat treating operation is more similar to straight run gasoline and can be similarly treated. For example, it can be refined by a light acid treatment with concentrated sulphuric acid using for example 2 to 3 lbs. of acid per barrel of treated product.

*Example 2.*—A similar crude pressure distillate was heated gradually to a temperature of 300° C. and 250 lbs. pressure and maintained at approximately that temperature and pressure for a period of 3 hrs. after which the resulting product was cooled and redistilled. The crude pressure distillate contained 66% of gasoline cut at 225° C. while the heat treated product contained 63%.

*Example 3.*—A crude distillate from the Cross cracking process of very yellow color was used which gave 71% of yellow gasoline up to 225° C. cut. This crude product was heated to 338° C. and 220 lbs. pressure and held at approximately that temperature and pressure for 3 hrs. The treated product gave 67% of gasoline cut at 225° C. The gasoline distillate up to 200° C. was water white and that from 200 to 225° C. was only very faintly yellow. This treated product when treated with an aqueous solution of calcium hypochlorite containing 15 grams of available chlorine per liter, in amount equivalent to 0.1 lb. of available chlorine per 42 gallon barrel, gave a satisfactory refined product from which all malodorous compounds had been removed and the product was negative to the doctor and copper corrosion tests for sulphur. In its treatment with hypochlorite solution the heat treated product responds in much the same way as straight run distillates, a simple hypochlorite treatment being sufficient to complete the refining operation. This hypochlorite refining can advantageously be carried out with the heat treated product before redistillation so that a single distillation is sufficient after the heat treatment and hypochlorite treatment. Where, however, the treated product is first distilled, the distillate can similarly be treated with hypochlorite.

At the end of the heat treatment and while the distillate is still at a high temperature and pressure, the material may be subjected to fractional distillation, with refluxing if necessary, and the desired gasoline fraction directly obtained, with utilization of the heat present in the still and charge at the end of the heat treatment for affecting the distillation, this heat being supplemented if necessary by additional heat toward the end of the distillation; or the remaining undistilled portion of the charge being separately drawn off from the still.

The heat treatment process of the present invention can be carried out in apparatus of various types. It can be carried out for example in stills of the character commonly used in pressure distillation process or so-called digestion processes, provided these stills are capable of withstanding the necessary pressure to permit the required temperature to be secured. The process can be carried out either as a batch process in large stills or treaters; or it can be carried out as a continuous process for example by passing the material through a sufficiently long pipe coil or coils maintained at the proper temperature, and with a rate of flow that will insure a sufficient period of time in the apparatus to bring about the proper treatment.

The process, whether carried out as a continuous or batch process, may be combined with cracking processes, for example, with high temperature and pressure digestion processes so that the distillate or the entire cracked product from the digestion operation is cooled to a temperature below cracking but sufficiently high for the desired reaction, and is kept at such temperature and pressure over a sufficient period of time to permit the desired reaction to take place, after which the resulting treated product can then be subjected to distillation and further treatment. Where the process is thus combined with a cracking apparatus, the subsequent treating still or apparatus should be of sufficient size or capacity, or a plurality of such stills or apparatus should be provided, so that the cracked product can be maintained over a comparatively long period of time at the desired lower temperature and pressure, further heating being provided if necessary to maintain the proper temperature over the necessary period of time.

I claim:

1. The method of treating lighter hydrocarbon oils resulting from the cracking of heavier petroleum oils, which comprises subjecting such lighter oils alone and in the liquid phase to a high temperature below that at which any appreciable cracking takes place under high pressure and thereafter distilling the treated oil, continuing the treatment preceding distillation until volatile coloring materials present are converted into constituents non-volatile during the subsequent distillation.

2. The method of treating lighter hydrocarbon oils resulting from the cracking of heavier petroleum oils, which comprises subjecting such lighter oils alone to a temperature of around 275° to 360° C. under a pressure sufficient substantially to prevent vaporization and thereafter distilling the treated oil, continuing the treatment preceding distillation until volatile coloring materials present are converted into constituents non-volatile during the subsequent distillation.

3. The method of treating cracked petroleum gasolines, which comprises maintaining the same alone and in the liquid phase at a high temperature below that at which any appreciable cracking takes place under a high pressure and thereafter distilling the treated gasoline, continuing the treatment preceding distillation until volatile coloring materials present are converted into constituents non-volatile during the subsequent distillation.

4. The method of treating cracked petroleum gasolines, which comprises subjecting the same alone to a temperature of around 275° to 360° C. under a pressure sufficient substantially to prevent vaporization and thereafter distilling the treated gasoline, continuing the treatment preceding distillation until volatile coloring materials present are converted into constituents non-volatile during the subsequent distillation.

5. The method of treating cracked petroleum gasolines, which comprises subjecting the same alone to a temperature of around 275° to 360° C. under a pressure sufficient substantially to prevent vaporization for a period of about 2 to 3 hours.

6. The method of treating cracked petroleum gasolines, which comprises subjecting the same alone to a temperature of more than about 275° C. and less than that at which any appreciable cracking takes place under a pressure sufficient substantially to prevent vaporization for a period of more than about 2 hours.

In testimony whereof I affix my signature.

BENJAMIN T. BROOKS.